(12) United States Patent
Hince

(10) Patent No.: US 7,160,483 B1
(45) Date of Patent: Jan. 9, 2007

(54) SOLID-CHEMICAL COMPOSITION FOR THE NON-EXOTHERMIC CHEMICAL OXIDATION AND AEROBIC BIOREMEDIATION OF ENVIRONMENTAL CONTAMINANTS

(76) Inventor: Eric Christian Hince, 25 Day Rd., Campbell Hall, NY (US) 10916

( * ) Notice: Subject to any disclaimer, the term of this patent is extended or adjusted under 35 U.S.C. 154(b) by 0 days.

(21) Appl. No.: 09/722,878

(22) Filed: Nov. 27, 2000

(51) Int. Cl.
*A01N 1/00* (2006.01)

(52) U.S. Cl. .............................. 252/186.2; 252/186.43; 252/186.44

(58) Field of Classification Search ............. 252/186.1, 252/186.2, 186.43, 186.44
See application file for complete search history.

(56) References Cited

U.S. PATENT DOCUMENTS

| | | | |
|---|---|---|---|
| 3,796,637 A | | 3/1974 | Fusey |
| 4,470,839 A | * | 9/1984 | Gago .......................... 427/213 |
| 4,891,320 A | | 1/1990 | Aust et al. |
| 5,264,018 A | * | 11/1993 | Koenigsberg et al. ......... 71/63 |
| 5,476,788 A | | 12/1995 | Lamar et al. |
| 5,648,064 A | * | 7/1997 | Gaffar et al. .................. 424/49 |
| 5,725,885 A | * | 3/1998 | Felix et al. .................. 210/610 |
| 5,741,427 A | | 4/1998 | Watts et al. |
| 5,866,003 A | | 2/1999 | Okubo et al. |
| 5,879,107 A | | 3/1999 | Kiest et al. |
| 6,268,205 B1 | * | 7/2001 | Kiest et al. ............... 435/262.5 |

\* cited by examiner

*Primary Examiner*—Cephia D. Toomer

(57) ABSTRACT

The main purpose of the present invention is to provide solid-chemical compositions and methods and means for their use which specifically: (1) provide for a sustained release of active oxygen and complex inorganic phosphates; and (2) create, enhance, and maintain oxidizing and aerobic conditions which favor non-exothermic, chemical-oxidation processes and aerobic bioremediation and fungal bioremediation processes. The present invention discloses advanced solid-chemical compositions and methods for the non-exothermic chemical oxidation and aerobic and fungal biodegradation of organic compounds and certain inorganic contaminants which may be present in solid and liquid wastes, sludges, leachates, acid-mine drainages, waste waters, soils, sediments, ground waters, surface waters, and other environmental media. The preferred embodiments of the disclosed solid-chemical compositions are prepared and used in the forms of granules, briquettes, tablets, capsules, pellets, and the like, which among other advantages, are easier to handle and apply under typical field conditions. These preferred forms of the disclosed chemical compositions can be made to disintegrate subsequent to their application and/or upon contact with water in a significant and predictable manner via relatively minor variations in their formulation and manufacture. This improved functionality enables the time-dependent release profile(s) of the active-oxygen sources and other ingredients to be varied so as to optimize the remediation of contaminants based on site-specific factors or factors pertaining to the specific waste-stream, media and/or the contaminants therein. Organic contaminants which can be treated using this invention include many different types of petroleum products, and more recalcitrant contaminants such as PCBs, PAHs and pesticides can be degraded by using the disclosed compositions and methods to stimulate fungal biodegradation processes. This invention can also be used to treat inorganic contaminants such as the acids and metals present in acid-mine drainage (AMD).

23 Claims, 3 Drawing Sheets

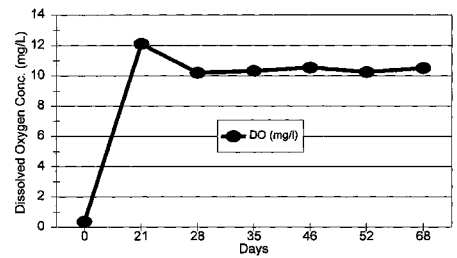

TABLE 1
*EZ-Ox Field Evaluation / Monitoring Data; TAC Well MW-107
Geovation Technologies, Inc.

| | Baseline | | | | | | |
|---|---|---|---|---|---|---|---|
| Well / Sample Location | MW-107 | MW-107 | MW-107 | MW-107 | MW-107 | MW-107 | MW-107 |
| Days from Baseline/ EZ-Ox Installation | 0 | 21 | 28 | 35 | 46 | 52 | 68 |
| Date Sampled | 09/08/00 | 09/29/00 | 10/06/00 | 10/13/00 | 10/24/00 | 10/30/00 | 11/15/00 |
| Field Parameters | | | | | | | |
| Temperature (C) | 17.40 | 17.20 | 17.20 | 16.90 | 16.40 | 16.10 | 15.80 |
| pH (S.U.) | 6.93 | 9.36 | 8.02 | 8.04 | 7.68 | 8.47 | 8.90 |
| Redox (millivolts) | -132.90 | 158.70 | 165.70 | 198.50 | -36.50 | -20.20 | -9.30 |
| Dissolved Oxygen (mg/l) Initial/w Sock | 0.36 | 12.10 | 10.21 | 10.33 | 10.55 | 10.25 | 10.52 |
| Dissolved Oxygen (mg/l) w/o Sock | --- | 9.25 | 7.29 | 6.31 | 7.68 | 5.10 | 4.83 |
| * EZ-Ox Composition: Series 1, Ver 1.3 | | | | | | | |
| Increase in DO from Baseline (mg/L) | --- | 11.74 | 9.85 | 9.97 | 10.19 | 9.89 | 10.16 |
| Increase in Sustained D.O. from Base | --- | 8.89 | 6.93 | 5.95 | 7.32 | 4.74 | 4.47 |

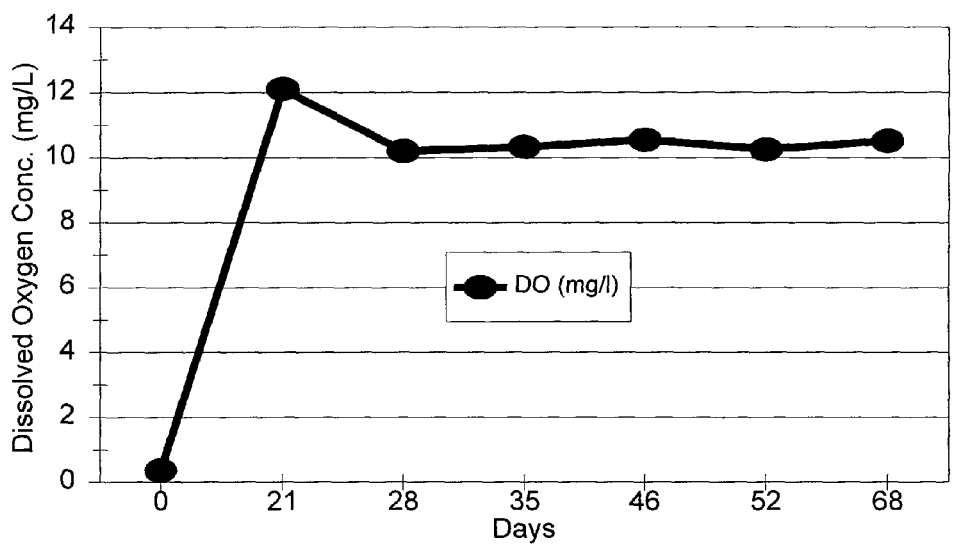

FIGURE 1
DO Levels in Well MW-107

TABLE 2
**\*EZ-Ox Field Evaluation / Monitoring Data; TAC Well MW-105
Geovation Technologies, Inc.**

Parameter/Description

| | Baseline | | |
|---|---|---|---|
| Sample Location | MW-105 | MW-105 | MW-105 |
| Days from Baseline/ EZ-Ox Installation | 0 | 6 | 22 |
| Date Sampled | 10/24/00 | 10/30/00 | 11/15/00 |
| Field Parameters | | | |
| Temperature (C) | 15.30 | 15.10 | 14.20 |
| pH (S.U.) | 7.35 | 9.11 | 9.13 |
| Redox (millivolts) | -36.30 | -121.30 | -33.20 |
| Dissolved Oxygen (mg/l) Initial/w Sock | 0.35 | *19.99* | *19.99* |
| Dissolved Oxygen (mg/l) w/o Sock | – | 19.99 | 19.32 |
| * EZ-Ox Product: Series 4, Ver. 4.1 | | | |
| Increase in DO from Baseline (mg/L) | --- | 19.64 | 19.64 |
| Increase in Sustained D.O. from Base | --- | 19.64 | 18.97 |

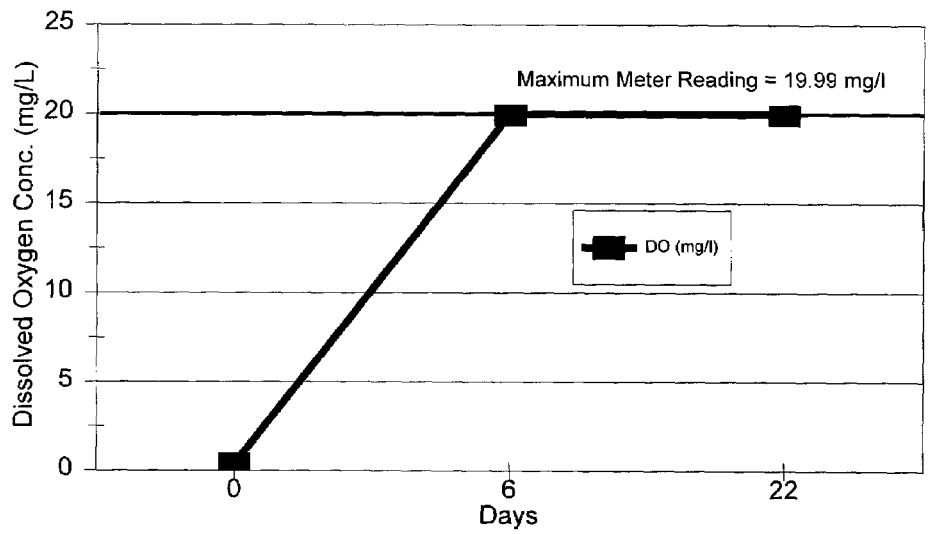

FIGURE 2
DO Levels in Well MW-105

TABLE 3
**\*EZ-Ox Field Evaluation / Monitoring Data; TAC Well MW-105
Geovation Technologies, Inc.**

Parameter/Description

| | Baseline | | |
|---|---|---|---|
| Sample Location | MW-109 | MW-109 | MW-109 |
| Days from Baseline/ EZ-Ox Installation | 0 | 6 | 22 |
| Date Sampled | 10/24/00 | 10/30/00 | 11/15/00 |
| Field Parameters | | | |
| Temperature (C) | 15.60 | 15.30 | 15.00 |
| pH (S.U.) | 6.99 | 9.05 | 9.62 |
| Redox (millivolts) | -90.00 | -111.00 | 20.70 |
| Dissolved Oxygen (mg/l) Initial/w Sock | 2.32 | *19.99* | 19.30 |
| Dissolved Oxygen (mg/l) w/o Sock | 1.19 | *19.99* | 10.19 |
| * EZ-Ox Product: Ver. 5.1 | | | |
| Increase in DO from Baseline (mg/L) | --- | 17.67 | 16.98 |
| Increase in Sustained D.O. from Base | --- | 17.67 | 7.87 |

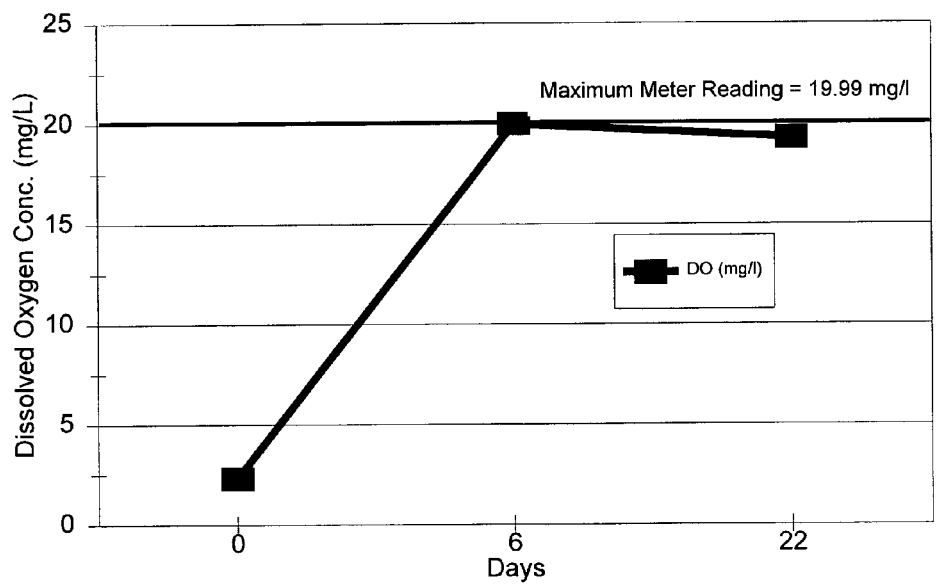

FIGURE 3
DO Levels in Well MW-109

SOLID-CHEMICAL COMPOSITION FOR THE NON-EXOTHERMIC CHEMICAL OXIDATION AND AEROBIC BIOREMEDIATION OF ENVIRONMENTAL CONTAMINANTS

BACKGROUND

1. Field of the Invention

This invention discloses the formulation and use of an advanced solid-media chemical composition designed and intended to enhance the removal of a broad range of environmental contaminants, including petroleum hydrocarbons and low molecular weight halogenated organic compounds, from industrial wastes, soils, sediments, sludges, ground waters, surface waters, and the like. In particular, this invention provides an improved means of promoting the chemical oxidation and aerobic, biologically mediated degradation, transformation, and/or detoxification of a broad range of organic contaminants in the environment, including, but not limited to, petroleum products such as gasoline, diesel fuel, fuel oils, and lubricating oils and halogenated organic solvents such as perchloroethylene, trichloroethylene, trichloroethane, and freon. Either alone or in combination with other liquid and solid-chemical compositions, the present invention also has the potential for the remediation of MTBE. This invention provides improved means for: (i) providing for a sustained release of active oxygen, (ii) creating, enhancing, and maintaining aerobic conditions (i.e., high-dissolved oxygen and positive Eh values), (iii) providing a source of co-substrates and nutrients to promote the growth of contaminant-degrading microorganisms, and (iv) providing sources of inoculum of beneficial microorganisms which act to promote the biodegradation of contaminants. This invention specifically reveals an improved, solid-chemical composition and related methods which are designed to provide the combined benefits of relatively long-term, low-temperature chemical-oxidation processes, (akin to a gentler or less-aggressive Fenton reaction), as well as the enhancement of aerobic biological processes which work together to promote the biodegradation, transformation, and/or detoxification of the aforementioned environmental contaminants.

2. Description of Prior Art

Soil and ground-water pollution caused by chemical contaminants released into the environment is a well documented, world-wide problem. Such chemical contamination is associated with many different types of industrial activities over the last two centuries. Common environmental contaminants include several different types and forms of petroleum hydrocarbons and halogenated organic compounds including solvents (e.g., tetra- and trichloroethene, methylene chloride). The available toxicological data indicates that many of these contaminants, in particular many of the halogenated organic compounds, are either carcinogenic or potentially carcinogenic to both man and animals. In addition, the available environmental and ecological data have shown that many of these contaminants tend to persist in the environment for long time periods. The long-term stability and extremely slow degradation of many such environmental contaminants presents a substantial, long-term hazard to human health and the environment throughout the industrialized world.

The disclosed invention relates to the use of oxygenation compounds, and mixtures of these oxygenation compounds with microbial co-substrates and nutrients, to foster both the chemical oxidation and aerobic bioremediation of petroleum hydrocarbons and low-molecular weight chlorinated organic solvents in soil and ground water.

Chemical-oxidation treatment of wastes generally involves the use of strong oxidizing agents such as hydrogen peroxide, ozone, potassium permanganate, and other agents to chemically transform and/or destroy organic wastes in liquid, particularly aqueous wastes. Many chemical-oxidation practices taught in the prior art involve the use of such oxidizers to chemically destroy or transform undesirable organic compounds, such as organic solvents in such waste streams. Chemical-oxidation reactions may also be used to oxidize inorganic compounds, such as the reduced forms of certain metals, into their oxidized forms. In theory and practice, the oxidizing agents generate highly reactive, short-lived species of oxygen, such as the hydroxyl radical (.OH), which subsequently oxidize the organic and inorganic compounds. The complete chemical-oxidation of organic compounds would in theory produce carbon dioxide and water as the ultimate end products. Chemical oxidation has been used to remediate organic contaminants in soil, ground-water, and industrial waste streams. Most of the prior art on this topic address applications of the "classic" chemical-oxidation reaction, the so-called Fenton reaction, which involves the use of Fenton's Reagent, i.e., ferrous iron ($Fe^{2+}$). The ferrous iron serves as a catalyst for the chemical-oxidation of an organic substrate in the presence of the hydroxyl radical provided for by an oxidizing agent, such as hydrogen peroxide. The fundamental chemistry of the Fenton reaction has been known for approximately 100 years and the reagents used are readily available and relatively inexpensive. Unfortunately for in-situ environmental-remediation applications, chemical-oxidation reactions involving the use of strong oxidizers such as concentrated hydrogen peroxide or potassium permanganate are vigorous and exothermic, and can generate dangerous amounts of heat and toxic and potentially explosive fumes which necessitate the incorporation of significant health-and-safety precautions otherwise not be required for other in-situ technologies such as bioremediation. In fact, there was a recently documented case in Wisconsin whereby the heat generated by the in-situ injection of hydrogen peroxide produced vapors which actually exploded, causing extensive damage to the site.

Many of the so-called conventional methods for the remediation or clean-up of chemically contaminated wastes, waters, soils, and sediments have generally involved either the physical removal of the contaminated media or the simple mass transfer of the contaminants from one media (e.g., soil) to another (e.g., air). In general, such physical-treatment technologies do not involve the chemically and/or biologically mediated breakdown, transformation, or detoxification of the contaminants. Two of the most common categories of physical environmental remediation technologies are the excavation of contaminated soils and the pumping and subsequent treatment of contaminated ground water. The excavation of contaminated soils is often followed by their disposal in a landfill, which can pose a potential long-term risk to the environment. Many ground-water pump-and-treat processes involve the simple mass-transfer or "stripping" of the contaminants from the water into the air. Another common physical-treatment method involves the use of granular activated carbon (GAC) reactors to treat chemically contaminated waters. When contaminated water is passed through a GAC reactor, the contaminants are physically adsorbed onto the carbon particles, thereby producing another contaminated media which requires subsequent disposal and/or treatment. Each of these physical-treatment technologies shares the same disadvantage—i.e., they do not reduce the actual amount or toxicity of the chemical contaminants, but rather they simply involve the mass-transfer of the contaminants from one place or media to another.

Bioremediation involves the use of microorganisms, such as bacteria and fungi, to convert chemical compounds into innocuous or less harmful chemical compounds. Bioremediation technologies generally have lower costs associated with their use and implementation than do the competing physical technologies. Bioremediation technologies are also applicable to a broader range of contamination problems and variations in field conditions than physical-treatment technologies. Most bioremediation technologies also do not present significant health & safety issues such as those posed by the use of exothermic, Fenton-type chemical-oxidation reactions. Bioremediation processes may be aerobic, which require the addition of oxygen, or anaerobic, which do not require oxygen.

The most promising bioremediation technologies provide the additional capability of treating contaminated media in-situ, i.e., in place, without the need for ground-water pumping or soil excavation. Current trends in bioremediation technology indicate that the most technically feasible and commercially successful bioremediation technologies are those which utilize indigenous or "native" contaminant-degrading bacteria (CDB), fungi and other microorganisms which are naturally present in the contaminated media. The presence of CDB in many different types of environments has been extensively reported in the scientific literature. There is an extensive body of prior art literature and patents concerning various means of using both aerobic and anaerobic CDB (as well as engineered or cultured bacteria) to biodegrade organic contaminants in water, soil, and industrial wastes. An important requirement of bioremediation processes which use native or "added" aerobic microorganisms is to provide sufficient amounts of oxygen and nutrients to promote the growth of bacteria and other organisms that can degrade environmental contaminants. Hence, it may be important to add sources of oxygen and inorganic nutrient forms of nitrogen and phosphorus, which can be added through a variety of means to increase the activity of the native CDB population.

U.S. Pat. No. 3,796,637 to Fusey discloses the use of compositions containing from 10% to 40% by weight of a metal oxide (e.g., iron oxide, manganese dioxide, zinc oxide) and/or alkali metal peroxide (e.g., sodium peroxide, potassium peroxide) which promotes the biological degradation of hydrocarbon-containing waste materials. The use of oxygenating compounds leads to aerobic fermentation which reduces the nuisance odors associated with anaerobic fermentation. The compositions may also contain nutrient substances (e.g., corn liquor, malting wastes or residues, molasses) and/or nitrogen species (e.g., urea, ammonium phosphate, ammonium nitrate, ammonium sulfate). Fusey does not disclose the use of complex phosphate compounds which serve as both oxygen release moderators and supplemental nutrients for the native contaminant-degrading bacteria. Likewise, Fusey fails to address the role of the metallic peroxides as stimulating long-term, low-temperature chemical oxidation processes. Hence, Fusey does not disclose the present invention.

U.S. Pat. No. 5,264,018 to Koenigsberg et al. discloses a method for decontaminating soil by applying an oxygen delivery vehicle (i.e., oxygen release compounds; "ORC") such as peroxides of calcium, potassium, or magnesium or mixtures thereof in an amount which increases the population of microorganisms in the soil that promote the biological degradation of environmental pollutants. The rate of liberation of oxygen from the ORC is controlled by adding a source of a simple phosphate (e.g., dihydrogen phosphate alkali metal salts, hydrogen phosphate alkali metal salts, urea phosphate, monoammonium phosphate, diammonium phosphate) into the aqueous phase during preparation of the metal peroxide to achieve the "intercalation" of the simple phosphates with the metal peroxides. The composition may additionally comprise a surfactant, macronutrients, micronutrients, or other beneficial additives for supplementing the nutrition and environment of the pollutant degrading microorganisms. Koenigsberg et al. do not disclose the use of complex phosphate compounds or other unique advantages of the present invention. Likewise, Koenigsberg et al. fail to acknowledge or disclose the use of the metallic peroxides to stimulate long-term, non-exothermic chemical-oxidation processes. Hence, Koenigsberg et al. do not disclose the present invention.

U.S. Pat. No. 5,866,003 to Okubo et al. discloses an apparatus for degrading environmental pollutants via aerobic bioremediation in-situ or ex-situ by supplying microorganisms and materials required by the microorganisms for degrading the pollutants. The materials supplied include oxygen release compounds including hydrogen peroxide and calcium peroxide as well as a nutrient supply. One benefit of this invention is that the oxygen is allowed to co-migrate downstream with the pollutant instead of supplying the oxygen to the microorganisms all at once. Likewise, the oxygen donors, nutrients and minerals are provided in the form of solids or semi-solids which can be further supplied as granules to provide for easy handling. Okubo et al. do not disclose the use of complex phosphate compounds or other unique advantages of the solid-chemical composition disclosed herein. Okubo et al. also fail to acknowledge or disclose the use of the solid- or semi-solid sources of active oxygen to stimulate long-term, non-exothermic, chemical-oxidation processes. Hence, Okubo et al. do not disclose the present invention.

U.S. Pat. No. 5,741,427 to Watts et al. discloses a method of treating contaminated soil and/or ground water comprising adding a source of an oxidizing agent, ligand donor, and a metal catalyst to the in-situ environment to promote and control the conversion of contaminants through the use of a chemical oxidation process. Sources of oxidizing agents include those that typically generate free radicals (e.g., calcium peroxide, sodium peroxide, ozone) and metal catalysts including metal salts, iron oxyhydroxides, iron chelates, and combinations thereof. This combination of oxidizing agents and metal catalysts promotes a Fenton's reaction in-situ. The composition is applied as a liquid through horizontal or vertical wells or infiltration trenches. Watts et al. fail to address the possible biological component of providing such oxygen donors to the environment. Watts et al. also do not disclose the use of complex phosphate compounds or other unique advantages of the solid-chemical composition disclosed herein. Hence, Watts et al. do not disclose the present invention.

U.S. Pat. No. 5,879,107 to Kiest et al. discloses a system and process for delivering fluids into subsurface contaminated soil and ground water to enhance in-situ microbial degradation of contaminants. The process uses a pattern of relatively closely spaced "vertical lancings" of the underground zone of contaminants dropped from the surface, using a high pressure low volume fluid infusion of a water slurry of time released oxygen compound providing chemicals and nutrients and/or microbes that biodegrade the pollutants. The fluid consists of a water slurry of magnesium peroxide with urea, ammonium phosphate, ammonium sulfate or a mono-potassium phosphate and/or organisms with attributes which can attack and break down the hydrocarbon pollutants into intermediate by-products and eventually into harmless carbon dioxide and water. Kiest et al. do not disclose the use of complex phosphate compounds as disclosed herein or other unique advantages of the solid-chemical composition disclosed herein. Likewise, Kiest et al. fail to acknowledge or disclose the use of the time-released oxygen sources to stimulate long-term, non-exothermic chemical-oxidation processes. Hence, Kiest et al. do not disclose the present invention.

U.S. Pat. No. 4,891,320 to Aust et al. discloses a process for degrading environmentally persistent organic pollutant compounds by reacting them with fungal enzymes containing a lignin-degrading enzyme (white rot fungi) and hydrogen peroxide. Aust et al. describe a preferred embodiment of the disclosed process whereby the addition of a living fungus, such as the white-rot fungus *Phanerochaete chrysosporium*, provides both the generation of both a lignin-degrading peroxidase enzyme and hydrogen peroxide, thereby avoiding the need to actually add the hydrogen peroxide. Aust et al. emphasize the importance of the non-specific lignin-degrading enzymes produced by white-rot fungi in degrading halogenated aromatic compounds such as PCBs, DDT and the like. Aust et al. also disclose in their process the importance of maintaining nutrient-nitrogen limited conditions to optimize the fungal-related biodegradation of such contaminants. Aust et al. do not disclose a solid-chemical composition which provides means for the chemical oxidation or aerobic bioremediation of contaminants nor do they disclose other unique advantages of the present invention. Aust et al. also do not disclose the use of a solid-chemical, sustained-release source of active oxygen to stimulate fungal biodegradation processes. Hence, Aust et al. do not disclose the present invention.

U.S. Pat. No. 5,476,788 to Lamar et al. discloses a solid-phase bioremediation method using naturally occurring lignin-degrading fungi. The method includes the use of an inoculum containing one or more lignin-degrading fungi and a lignocellulosic substrate, followed by a period of aerating and hydrating, to degrade contaminants to less toxic products. Lamar et al. specifically disclose the use of lignin-degrading fungal strains of *Phanerochaete chrysosporium, Phanerochaete sordida*, and *Trametes hirsuta*. Lamar et al. discuss the importance of fungal "lignin peroxidases or ligninases" in the biodegradation process. Lamar et al. specifically disclose the use of their process for the "in-place bioremediation" of halogenated hydrocarbons such as pentachlorophenol. Like Aust et al., Lamar et al. also disclose the importance of maintaining nutrient-nitrogen limited conditions to optimize the fungal-related biodegradation, and Lamar et al. present data which they appear to indicate that the addition of nutrient nitrogen in the form of potassium nitrate and ammonium chloride actually inhibits contaminant biodegradation. Lamar et al. do not disclose a solid-chemical composition which provides means for the chemical oxidation or aerobic bioremediation of contaminants, the use of a solid-chemical, sustained-release source of active oxygen to stimulate fungal biodegradation processes, nor do they disclose other unique advantages of the present invention. Hence, Lamar et al. do not disclose the present invention.

M. Arisoy (Bulletin of Environmental Contamination and Toxicology, 60: 872–876; 1998) describes the biodegradation of chlorinated organic compounds such as DDT, lindane and heptachlor by white-rot fungi including *Phanerochaete chrysosporium, Pleurotus sajor-caju, Pleurotus florida*, and *Pleurotus eryngi*. Arisoy reported that contaminant biodegradation was only observed as a co-metabolic process during what is termed a "secondary metabolism." Arisoy, like Aust et al. and Lamar et al., noted that significant fungal contaminant biodegradation only occurred at high rates under nutrient-limited conditions. Arisoy does not disclose a solid-chemical composition which provides means for the chemical oxidation or aerobic bioremediation of contaminants does he disclose other unique advantages of the present invention. Hence, Arisoy does not disclose the present invention.

SUMMARY OF THE INVENTION

The main purpose of the present invention is to provide solid-chemical compositions and methods and means for their use which specifically: (1) provide for a sustained release of active oxygen and complex phosphates; (2) create, enhance, and maintain oxidizing conditions which favor non-exothermic, chemical-oxidation processes; and (3) create, enhance, and maintain aerobic conditions, (i.e., high dissolved oxygen concentrations), within contaminated environmental media to promote non-exothermic chemical-oxidation processes and aerobic and fungal bioremediation processes. In addition to providing sustained-release sources of active oxygen and complex inorganic phosphates, the solid-chemical compositions of the present invention may include several other beneficial agents to help promote both the chemical-oxidation and aerobic bioremediation of chemical contaminants as well as to enhance the form and function of the disclosed solid-chemical compositions.

The discoveries disclosed herein indicate and/or strongly suggest that such contaminants can be effectively destroyed via non-exothermic, chemical-oxidation processes or degraded, transformed, and/or detoxified by indigenous, contaminant-degrading aerobic bacteria when the solid-chemical compositions disclosed herein are applied to the contaminated media and the media are subsequently maintained under conditions favorable to the aerobic microorganisms and the biogeochemical reactions mediated by these organisms.

In accordance with the present invention there is provided novel and improved solid-chemical compositions and associated methods and means for their use to provide for a sustained release of active oxygen and complex inorganic phosphates to promote the non-exothermic chemical oxidation and aerobic biodegradation, transformation, and/or detoxification of organic compounds and certain inorganic contaminants as well, which may be present in solid and liquid wastes, sludges, leachates, acid-mine drainages, waste waters, soils, sediments, ground waters, surface waters, and other environmental media. The principles of this invention provide relatively rapid and cost-effective means for both the non-exothermic chemical-oxidation and the aerobic bioremediation of chemical contaminants which convert these contaminants into non-hazardous mineral forms and/or less hazardous by-products. Based on the principles and advantages of the present invention, organic contaminants which may be treated using the solid-chemical compositions and methods disclosed herein include, but may not be limited to, undesirable microorganisms and microbial pathogens of beneficial plants, animals and fungi; polycyclic aromatic hydrocarbons (PAHs), coal tar, crude oil, No. 6 fuel oil, No. 5 fuel oil, No. 4 fuel oil, No. 2 fuel oil (home heating oil), lubricating oils, motor oils, hydraulic oils, grease, diesel fuel, jet fuel (aviation gasoline), kerosene, paraffin, gasoline, aromatic solvents, mineral spirits, methyl tertiary butyl ether (MTBE) and other ethers, tertiary butyl alcohol (TBA) and other alcohols, formaldehyde and other aldehydes, acetone and other ketones, 1,1,1-TCA, tetrachloroethene (PCE), trichloroethene (TCE), dichloroethenes, dichloroethanes, vinyl chloride, freon and other halogenated solvents, polychlorinated biphenyls (PCBs), dioxins, organochlorine pesticides, organophosphorus pesticides, chlorinated phenols, and any combinations thereof. Inorganic contaminants which may be treated using the solid-chemical compositions and methods of the present invention include, but may not be limited to, the reduced and/or toxic forms and compounds of heavy metals, inorganic acids, and the like.

A further object of the invention is to present means by which to overcome the disadvantages associated with not only the traditional "physical" methods of remediation previously described, but previous compositions, methods and means for driving chemical-oxidation processes, and previous compositions, methods, and means for aerobic bioremediation described in the prior art. The present invention also provides for significant cost savings relative to other means and methods for environmental remediation, as it can reduce or eliminate the need for excavation, pumpage, transportation, and/or off-site treatment of contaminated wastes, soil, or water.

These and other objects and advantages of the present invention will become apparent to those skilled in the art following the detailed description of the invention, which reveals the novel aspects and advantages of the present invention, and more particularly by the appended claims.

BRIEF DESCRIPTION OF THE FIGURES

Embodiments of the present invention will now be described more fully with reference to the following drawings in which;

FIG. 1 illustrates the effects of a preferred embodiment of the disclosed solid-chemical composition on the dissolved oxygen (DO) concentrations in contaminated ground-water.

FIG. 2 illustrates the effects on DO levels in contaminated ground-water in response to the application of another preferred embodiment of the disclosed solid-chemical composition.

FIG. 3 is a graph which illustrates the effects of a third preferred embodiment of the disclosed composition on DO levels in ground water.

DETAILED DESCRIPTION OF THE INVENTION

The present invention disclosed herein provides unique solid-chemical compositions and methods for the bioremediation of wastes and environmental media contaminated with organic contaminants such as petroleum hydrocarbons (e.g., gasoline, oils, and PAHs) and halogenated solvents such as tetrachloroethene, trichloroethene, 1,1,1-trichloroethane, freon, and the like. The use as intended of the disclosed solid-chemical compositions and methods provides for a combination of means, mechanisms, processes, and factors which enhance the non-exothermic chemical-oxidation of chemical contaminants and the aerobic biodegradation, transformation, and/or detoxification of chemical contaminants in the environment. Based on the knowledge and beliefs of the inventor, the present invention may also have the potential to destroy "biological" pollutants, such as undesirable microorganisms, for applications which include, but may not be limited to, the disinfection of pools, ponds, manufacturing equipment and the like. The disclosed solid-chemical composition is comprised of a minimum of two components as follows:

(a) a solid-chemical source of active oxygen; and
(b) a source of complex inorganic phosphates.

In addition, up to eight additional components may be included in the solid-chemical composition. These additional components serve as sources of a number of additional beneficial agents, such as sources of nutrient nitrogen, simple phosphates, microbial inoculum, metal catalysts (to enhance chemical-oxidation reactions), disintegrants (to help break-up the preferred forms of granules, briquettes and the like), and lubricants/manufacturing aids for the preparation of such preferred forms of the disclosed solid-chemical composition.

Based on the foregoing and in accordance with the present invention, there are provided means for driving the non-exothermic chemical-oxidation of chemical contaminants and for promoting the aerobic and fungal biodegradation, transformation, and/or detoxification of such contaminants in wastes, soils, and sediments, and comprising the formulation, preparation, application and use of the unique solid-chemical composition and methods disclosed herein. The solid-chemical composition of the present invention is comprised of at least two and as many as ten components as described below.

The first essential component of the disclosed solid-chemical composition is comprised of a solid-chemical source of active oxygen from about 20% to 99% by weight of the composition. In the preferred embodiment of the present invention, the solid-chemical source of active oxygen is preferably selected from the group which consists of calcium peroxide and magnesium peroxide. These compounds are commercially available, relatively inexpensive and among the safest to handle of the available "peroxygen" chemicals. These peroxide compounds also have characteristics which enable them to be readily prepared in the preferred forms of briquettes, granules, tablets, pellets and the like—i.e., they compact well. Upon application to the environment and exposure to water, these solid-chemical compounds provide for the sustained release of active oxygen which helps to promote the aerobic biodegradation and transformation of environmental contaminants. In addition, based on the research and beliefs of the inventor, such sources of active oxygen also appear to support a relatively long-term, non-exothermic/low-temperature chemical-oxidation process, akin to a relatively "gentle" Fenton-type reaction. This latter advantage of the present invention is also facilitated by the fact that elevated levels of ferrous iron, the so-called "Fenton's reagent," are typically present in contaminated wastes and contaminated environmental media, such as ground waters impacted by releases of petroleum hydrocarbons and organic solvents.

The second essential component of the disclosed composition comprises a source of complex inorganic phosphates from about 1% to 80% by weight of the composition. These complex inorganic phosphates are preferably selected from one or more of the group which consists of sodium hexametaphosphate, sodium trimetaphosphate, sodium tripolyphosphate, sodium-potassium tripolyphosphate, tetrasodium pyrophosphate, and other ringed metaphosphates and linear polyphosphates. Based on the past experience of the inventor, such complex phosphates provide superior forms of nutrient phosphorus for in-situ environmental-remediation applications as they are much less geochemically "reactive" than simple orthophosphates, and hence much less prone to loss through abiotic processes, such as the formation of metal-orthophosphate precipitates. Consequently, these complex phosphates provide means for the more effective and efficient delivery of nutrient phosphorus, particularly in applications to biogeochemically active environments such as chemically contaminated solid and aqueous media.

Another important and perhaps critical function and advantage of the use of complex phosphates in the disclosed composition is that they provide sequestering and anti-scaling properties which help minimize the effects of certain disadvantageous chemical reactions, such as mineral-precipitation reactions, which often occur in chemically active or corrosive environments, such as those found in the immediate vicinity of active-oxygen sources. The recent work of the inventor indicates that these complex phosphates act to block or minimize these reactions which otherwise lead to the formation of relatively insoluble precipitates and mineral coatings. As such reactions could otherwise inhibit the release of the active-oxygen sources and other active ingredients within the disclosed composition, these complex phosphates perform an important and additional function in the present invention which is separate and distinct from their value as forms of nutrient phosphorus. Based on the recent work of the inventor as part of the development of the solid-chemical composition of the present invention, the use of sodium hexametaphosphate and sodium trimetaphosphate have been observed to be particularly effective in this regard even when used in relatively small amounts in proportion to the preferred sources of active-oxygen included in the first component.

Yet another important function and advantage of the use of complex phosphates in the disclosed composition is that they also tend to act as surfactants which can help enhance the chemical-oxidation and aerobic bioremediation processes facilitated by the disclosed solid-chemical composition. These complex phosphates provide different strengths and advantages when used as surfactants. For example, sodium tripolyphosphate is a well known and relatively powerful surfactant, such that even small amounts can help solubilize contaminants and/or prevent unwanted reactions. By comparison, sodium hexametaphosphate is a relatively mild surfactant which appears to be well-tolerated by microorganisms, such that it can be used in proportionately larger amounts in the present invention, which given the other advantages of the use of sodium hexametaphosphate in the present invention as described above, is an important and complimentary characteristic. In the embodiments of the disclosed composition tested by the inventor, the use of sodium trimetaphosphate appears to provide for an intermediate level of surfactancy. The other complex phosphates cited above provide for a range of surfactant activity when used in the solid-chemical composition of the present invention, particularly when more than one are used together. Based on both the past experience and the recent work of the inventor as part of the development of the solid-chemical composition of the present invention, the use of more than one complex phosphate is preferred in the present invention.

In the present invention, another component comprising an inorganic source of electron acceptor and nutrient nitrogen may be included in the solid-chemical composition from about 0.1% to 10% by weight of the total composition. In the preferred forms of the present invention, an ammonium-free source of nutrient nitrogen is used which is selected from one or more of the group which consists of sodium nitrate, sodium-potassium nitrate, potassium nitrate and other nitrates. Such ammonium-free sources of inorganic nitrogen can help promote biologically mediated denitrification processes which can enhance and compliment the oxygen-based processes facilitated by the disclosed composition. Although denitrification is technically an "anaerobic" process, it can proceed in tandem with oxygen-driven processes and in oxygen-rich environments; hence, this component provides a distinct and complimentary advantage when used in the solid-chemical composition of the present invention. Moreover, the provision of such nutrient and/or electron acceptor forms of inorganic nitrogen helps to optimize various bioremediation processes mediated by biological organisms (e.g., plants, multicellular fungi) and microorganisms (e.g, bacteria, mycoplasmas and yeasts).

An additional component may be included in the solid-chemical composition which comprises a source of simple inorganic orthophosphates from about 0.1% to 35% by weight of the total composition. The simple inorganic phosphates are preferably selected from the group which includes sodium phosphate, calcium phosphate, potassium phosphate, and sodium-potassium phosphate. The inclusion of simple inorganic orthophosphates within the disclosed solid-chemical composition provides additional and complimentary sources of nutrient phosphorus for biological organisms, as well as additional sources of surfactants. Furthermore, the incorporation of such simple orthophosphates in the disclosed composition can provide additional means of controlling the release-rate profiles of the active-oxygen sources and other active ingredients included within the solid-chemical composition of the present invention, such as the complex phosphates and the sources of inorganic nitrogen.

An additional component may be included in the disclosed solid-chemical composition comprising a source of organic disintegrants from about 0.01% to 5% by weight of the total composition. This source of organic disintegrants is preferably selected from one or more of the group consisting of pre-gelled starch, powdered molasses, granulated sugar, sodium starch glycolate, crosscarmelose of sodium, and crospovidone. The inclusion of one or more such organic disintegrants in the solid-chemical composition of the present invention enable the composition to first be prepared, stored, handled and applied in the preferred forms of granules, briquettes, tablets and the like, and which subsequently cause such forms of the composition, when used as intended, to disintegrate after contact with water or moisture. Hence, the use of such disintegrants in the disclosed solid-chemical composition provides a means of achieving the enhanced active-oxygen release benefits afforded by the high surface-area of a fine powder without the storage, handling and application-related disadvantages of a powdered composition—a significant advantage of the present invention. The aforementioned organic disintegrants are specifically preferred over other cellulosic disintegrants for purposes of improving the intrinsic safety of the preparation, storage and handling of the preferred forms of the composition while retaining the functionality provided by the disintegrants. Cellulosic materials, while commonly used as binders, disintegrants and excipients in many solid-chemical compositions, such as pharmaceutical products, are considered less compatible with the preferred solid-chemical sources of active oxygen. In the preferred embodiment of the present invention, it is desirable to use the lowest amount of the aforementioned, preferred organic disintegrants which provide the desired disintegration characteristics of the preferred forms of the solid-chemical composition of the present invention (e.g., granules, briquettes, tablets and the like).

An additional component may be included in the disclosed solid-chemical composition comprising a source of inorganic disintegrants from about 0.05% to 10% by weight of the composition. The inorganic disintegrants are preferably selected from one or more of the group consisting of bentonite, montmorillonite, kaolinite, and other clay minerals. In the preferred embodiments of the present invention, these inorganic disintegrants provide a means for replacing or improving upon the disintegrant functionality otherwise provided for by the organic disintegrants. Such use of inorganic disintegrants can help minimize if not eliminate the "loss" of active oxygen to chemical-oxidation reactions involving organic disintegrants. In addition, based on the knowledge and beliefs of the inventor, the use of inorganic disintegrants in place of some or all of the organic disintegrants may provide for the further improvement of the intrinsic material safety of the preparation, storage and handling characteristics of the disclosed solid-chemical composition and the preferred forms thereof.

An additional component may be included in the solid-chemical composition of the present invention comprising a source of inorganic binders, fillers and buffers from about 0.5% to 60% by weight of the composition. In the preferred embodiment of the present invention, the inorganic binders, fillers and buffers are preferably selected from one or more of the group consisting of calcium carbonate, lime, limestone, siderite and ferrous carbonate, rhodochrosite and manganese carbonate, calcium phosphate, sodium bicarbonate, portland cement, metal oxides, metal hydroxides, metal oxyhydroxides and the like. The advantage of using the inorganic binders, fillers and buffers in one or more embodiments of the solid-chemical composition of the present invention is to aid the preparation of the aforementioned preferred forms of the composition, to buffer the pH of the composition and to reduce the cost of the composition. A specific advantage of including the aforementioned inorganic binders, fillers and buffers in the disclosed solid-chemical composition is to significantly reduce the cost of the composition for use in the treatment of acid-mine drainage and similar environmental problems for which huge quantities of the product may be required. For such applications, the aforementioned inorganic binders, fillers and buffers can significantly reduce the costs of the composition without sacrificing the primary treatment function and objective—i.e., to raise the pH and/or to reduce the acidity of the acidic discharges or waste streams being treated.

Another component may be included in the solid-chemical composition of the present invention which comprises a source of metal catalysts from about 0.25% to 25% by weight of the composition. In the preferred embodiment of the present invention, these metal catalysts would be selected from one or more of the group consisting of soluble salts of ferrous iron, (such as ferrous sulfate), as well as less-soluble forms of ferrous iron such as siderite, ferrous carbonate and the like. The use of such metal catalysts in the solid-chemical composition of the present invention can enhance the chemical-oxidation of environmental contaminants. The aforementioned metal catalysts are preferred as they provide a source of the so-called "Fenton's reagent," i.e., ferrous iron. Whereas the use of ferrous iron to enhance the chemical oxidation of chemical contaminants is well known, when used in combination with the other components in the solid-chemical composition as disclosed herein, and in consideration of the various advantages thereof, such sources of ferrous iron provide the present invention with unique and complimentary benefits.

An additional component may be included in the disclosed solid-chemical composition comprising a source of lubricants and like manufacturing aids from about 0.01% to 1.5% by weight of the composition. In the preferred embodiment of the present invention, these lubricants and like manufacturing aids would be selected from one or more of the group consisting of magnesium stearate, calcium stearate and other stearates, stearic acid, sodium stearyl fumarate, hydrogenated vegetable oil, silicone, talc, corn starch, and any combinations thereof. These lubricants and like manufacturing aids are important for the preparation of the disclosed solid-chemical composition in the preferred forms of briquettes, granules, tablets, and the like. The recent experience of the inventor has shown that the inclusion of as little as 0.5% magnesium stearate by weight in the composition successfully enabled the granulated forms of several different embodiments of the disclosed solid-chemical composition to be produced using commercially available equipment. In the preferred embodiment of the present invention, it is desirable to use the lowest amount of lubricants and like manufacturing aids which enable the cost-effective production of the aforementioned preferred forms of the solid-chemical composition of the present invention.

Another component may be included in the disclosed solid-chemical composition comprising a source of inoculum for dehydrated, dried and freeze-dried inoculum for biological organisms, microorganisms and fungi from about 0.0001% to 0.5% by weight of the composition. The inoculum would be selected from one or more of the group consisting of inoculum for aerobic bacteria, facultative bacteria and other bacteria capable of using oxygen as a terminal electron acceptor for any biogeochemical process; denitrifying bacteria; mycoplasmas; white-rot fungi, brown-rot fungi and other multicellular fungi; and yeasts. In the preferred embodiment of the present invention, said inoculum may be further selected from one or more of the group consisting of *Bacillus* spp., *Rhizobium* spp., *Bradyrhizobium* spp., *Fibrobacter* spp., *Clostridium* spp. *Pseudomonas* spp., *Geobacter* spp., *Arthrobacter* spp., *Nocardia* spp., *Aspergillus* spp., *Trichoderma* spp., *Candida* spp., *Yarrowia* spp., *Piptoporous* spp., *Serpula* spp., *Coriolus* spp., *Phanerochaete* spp., *Pleurotus* spp., *Sporotrichum* spp., and *Bjerkandera* spp., *Trametes* spp. and the like.

In the preferred embodiment of the solid-chemical composition of the present invention, the composition would be prepared and used in the form of granules, briquettes, tablets, capsules, pellets, and the like which can be manufactured using readily available equipment and processes. The inventor has successfully prepared several different embodiments of the solid-chemical composition disclosed herein in the forms of granules and briquettes using readily available equipment in an economical manner. These preferred forms of the disclosed composition are much easier and safer to store, handle, and use than other forms of the disclosed composition, as well as the powdered forms of other compositions disclosed in the prior art.

Another advantage of the preferred granule, briquette, pellet, capsule, or tablet forms of the composition disclosed herein is that such forms provide a means of varying the release-rate profiles of the active ingredients. Specifically, the rates at which these preferred forms of the disclosed chemical compositions disintegrate subsequent to their application and/or upon contact with water can be varied in a significant and predictable manner via relatively minor variations in their formulation and manufacture. This improved functionality enables the time-dependent release profile(s) of the active-oxygen sources and other ingredients to be varied so as to optimize the remediation of contaminants based on site-specific factors or factors pertaining to the specific waste-stream, media and/or the contaminants therein. The inventor has successfully manufactured granulated forms of several different embodiments of the disclosed solid-chemical composition of the present invention with widely varying disintegration rates. Based on the experimental observations and beliefs of the inventor, this variation in disintegration rates appears to have a direct and controlling effect on the release-rate profiles of the aforementioned "active" ingredients, particularly the source of active-oxygen. For example, by incorporating an organic disintegrant such as pre-gelled starch in amounts from about 2% to 4% by weight of the composition, the granules produced rapidly and completely disintegrate within several minutes after their application to a water column (see Examples 1 and 2). Hence, this embodiment of the present invention provides for the enhanced active-oxygen release characteristics of a fine, high-surface-area powder without the storage, handling and application-related disadvantages of a powder. By comparison, by incorporating an organic disintegrant such as pre-gelled starch in lesser amounts of about 1% by weight of the composition, the granules produced disintegrate relatively slowly and remain partially intact more than 4 weeks after application to a water column. Finally, by removing the organic disintegrant altogether, the granules produced remain largely intact more than 4 weeks after application to water.

Examples of remediation applications for which the slow-disintegrating granular forms of the solid-chemical composition is desirable would be the use of the composition in a permeable reactive barrier (PRB) for treatment of ground water, leachate seeps, and similar discharges of acid-mine drainage (AMD). In such an application, the granules can provide a "reactive" treatment zone of higher permeability relative to the surrounding matrix materials to enhance the flow of ground water, leachate, AMD and the like through the PRB. By contrast, fluid flow may bypass or "diverge" around a PRB made with a fine-powdered/concrete-like slurry because of their relatively low permeability. In addition to such PRB-type applications, recent field-test data suggests that these long-lasting granular forms of the disclosed composition may also be preferred for the more "routine" application of the composition to ground-water remediation. Specifically, the data from a ground-water contamination site suggest that the increased permeability of these granular forms, relative to the powdered form and the fully-disintegrated granules, may provide for the enhanced release of active oxygen (see Example 3).

Another benefit of the aforementioned preferred forms of the solid-chemical composition disclosed herein is that such forms are easier to use in application devices such as filter socks, canisters, and cartridges. Moreover, when applied within such application devices, these forms of the composition provide a sufficient amount of "sacrificial" internal void spaces which prevent the composition from swelling inside of the application device to the degree that the device becomes stuck when installed within wells, boreholes, pipes, manholes and the like. This is an important and significant advantage of the preferred forms of the chemical compositions and methods of the present invention relative to the prior art, particularly with respect to ground-water remediation applications. For example, numerous experts in the remediation field have informed the inventor that filter socks containing a "leading" solid-chemical peroxygen product on the market, (i.e., at the time of the disclosure of the present invention), have been reported to swell considerably and become stuck in wells. Hence, the present invention provides a significant and important means of overcoming this disadvantage of this prior-art composition.

The recent work of the inventor strongly suggests that the solid-chemical sources of active oxygen, such as that included in the solid-chemical composition disclosed herein, can stimulate the growth and enzymatic activity of fungal organisms, such as white-rot and brown-rot fungi. The literature and prior art concerning the ability of white-rot fungi and brown-rot fungi to degrade extremely recalcitrant chemical compounds, such as PCBs, pesticides and polycyclic aromatic hydrocarbons (PAHs), focuses on certain peroxidase enzymes, such as aryl-alcohol and manganese-dependant peroxidases, which are excreted extracellularly by these organisms and breakdown these complex organic compounds into much simpler byproducts. The prior art indicates that the overall activity of the peroxidases produced by white-rot and brown-rot fungi are important for both the growth of the fungal organisms and their ability to degrade such complex organic contaminants. The literature also suggests that the addition of hydrogen peroxide may enhance the growth of such fungi by increasing the activity of these peroxidases.

Based on both the existing science and the recent observations of the inventor, it is the inventor's belief that the solid-chemical sources of active oxygen, such as that included in the solid-chemical composition disclosed herein, provide an improved means of promoting the fungal biodegradation of recalcitrant environmental contaminants. As previously discussed, the active-oxygen sources included in the solid-chemical composition of the present invention provide for the non-exothermic, sustained release of active oxygen, which the inventor believes can be used to stimulate the growth and enzymatic activity of fungal organisms such as white-rot and brown-rot fungi. As white-rot and brown-rot fungi and similar fungal organisms are known to be slow-growing, the present invention provides an important advantage over the use of short-lived and/or highly reactive forms of active oxygen, such as hydrogen peroxide, which are quickly consumed in chemical reactions and may even kill the fungal organisms upon application. These advantages of the present invention are supported by the inventor's recent observations of simple bench-tests of various embodiments of the disclosed solid-chemical composition of the present invention showed clear evidence of significant fungal growth within two-to-four weeks of the application of these compositions to water. As no fungi were included in the compositions tested by the inventor, the experiments were apparently colonized by naturally occurring fungi which thrived under the conditions created by the compositions.

In summation, the functionality provided for by both the preferred forms and formulations of the solid-chemical composition disclosed in the present invention provide several important and significant advantages for the bioremediation of environmental contamination over the chemical compositions and methods of the prior art. These unique advantages of the present invention provide improved means for achieving the relatively rapid and effective aerobic bioremediation and non-exothermic chemical oxidation of organic and inorganic contaminants present in wastes, soils, waters, or sediments versus the means and methods disclosed in the prior art. The solid-chemical compositions disclosed herein and the means and methods for their intended use overcome many of the disadvantages associated with the compositions and methods for environmental remediation disclosed in the prior art.

EXAMPLES

The following examples are provided to illustrate the technical basis, merits and unique advantages provided by the present invention. These examples are not to be construed as limiting the present invention in any way, but are merely presented as examples of the unique advantages and non-obvious improvements of the present invention over the prior art and to illustrate the practice of the present invention as described in the appended claims.

Example 1

In experiments conducted by the inventor during the development of the solid-chemical composition of the present invention, several different chemical formulations were investigated and several manufacturing trials were conducted. These trials were conducted to evaluate the effects of different formulations and manufacturing methods for producing the preferred forms of the composition, particularly briquettes and granules. The recent testing of two distinctly different trial or "prototype" embodiments of the present invention revealed the critical importance of the incorporation of complex phosphates in the solid-chemical composition disclosed herein.

Prototype formulations designated as the "1" series and "2" series were manufactured using the same manufacturing process into granules of similar size. By example, the "1" series granulated compositions, which represent one of the preferred embodiments of the present invention, included, by weight, approximately ≧93% calcium peroxide, ≧4% organic disintegrants, specifically including pre-gelled starch, and ≧3% complex phosphates, specifically including both sodium hexametaphosphate and sodium trimetaphosphate. By comparison, the "2" series compositions were similar to the "1" series in most respects except that no complex phosphates were included.

Representative samples of approximately 1 gram each of both the "1" series and "2" series granulated compositions were placed in containers with approximately 150 ml of water and observed over approximately a 6-week time period. Although both granulated compositions were initially observed to break up into a powder-like slurry in a short time period ranging from several minutes to approximately one-half hour, the "2" series compositions were observed to form platy aggregates over time, significantly reducing the available surface-area and "flowability" of the material matrix. In addition, mineral scales and coatings were observed to form both on the surface of the water column above the composition and in and around the matrix of the "2" series compositions. By comparison, the "1" series compositions did not form platy aggregates after disintegration of the granules and remained as a relatively free-flowing, fine-powdered slurry over the course of the observation period. In addition, the mineral scales observed in the "2" series experiments were generally absent in the "1" series experiments. Moreover, oxygen appeared to be more effectively liberated by the "1" series composition due to the greater available surface area and the lack of mineral scales provided for by the incorporation of the complex phosphates in the "1" series formulation. These observations indicate that the incorporation of complex phosphates, including the aforementioned ringed metaphosphates, provide the solid-chemical composition disclosed herein with important and distinct advantages over the prior art.

Example 2

A field test was conducted at a site characterized by significant, long-term ground-water contamination caused by subsurface releases of gasoline using the "1" series granulated composition described above, one of the preferred forms and embodiments of the disclosed solid-chemical composition of the present invention. First, a filter sock was filled with approximately 2-lbs. of the "1" series granulated composition. Subsequently, the sock was placed inside a stainless-steel canister and lowered into the saturated portion of a 2-in. diameter ground-water monitor well using a rope. The test well (MW-107) was selected to be representative of contaminant conditions in the downgradient portion of the plume, with moderate aqueous-phase contamination levels measured prior to treatment of approximately 5 mg/l of total benzene, toluene, ethylbenzene and xylenes (BTEX) and 7 mg/l of total gasoline compounds.

Weekly monitoring of the ground water conditions was conducted beginning three weeks after the installation of the sock/canister system within the well. Dissolved oxygen, redox potential, pH, and temperature measurements were obtained over the course of more than six-weeks. As shown in Table 1 and illustrated by FIG. 1, these monitoring data indicate that the composition was found to significantly increase the dissolved oxygen (DO) concentrations and to maintain elevated DO conditions for more than 68 days. A significant and lasting increase in the redox potential was also achieved. Noteworthy is that the ground-water temperature was documented to decrease overtime, consistent with the seasonal transition from summer to fall, which lends empirical support to the inventor's belief that the present invention provides a means for facilitating a chemical-oxidation remediation process which is non-exothermic.

After 52 days of treatment with the disclosed composition, BTEX levels dropped 67% to approximately 1.6 mg/l and total gasoline compounds dropped 66% to approximately 2.4 mg/l. Dissolved levels of MTBE were also cut roughly in half, possibly due to the chemical oxidation of this compound. Overall, the results of this ongoing field test provide proof-of-concept evidence that the present invention can be successfully used for the critical "edge of plume" application scenario for ground-water remediation, which is anticipated to be one of the greatest demands for the present invention.

Example 3

Different granulated embodiments of the solid-chemical composition disclosed herein, denoted as the "4" and "5" series compositions, were applied to other wells at the test site described above in Example 2. The "4" series composition was similar in most respects to the "1" series described above except that the total amount of organic disintegrants was reduced to 1% by weight. The "5" series composition tested is representative of one of the simplest preferred embodiments of the present invention, as it included only calcium peroxide and complex phosphates in similar proportions to the "4" series composition and contained no disintegrants whatsoever. The wells selected for the field testing of "4" and "5" series embodiments of the disclosed composition were previously documented to contain an-order-of-magnitude higher aqueous concentrations of gasoline compounds than well MW-107 used in the "1" series field test described in Example 2—hence the contaminant conditions in these wells present a much greater chemical and biological demand for oxygen. Nonetheless, after three weeks of observations from the "4" series test (Table 2; FIG. 2) and the "5" series test (Table 3, FIG. 3), the available monitoring data show consistent increases in DO, pH, and redox potential with no increase in temperature.

As an additional field-application related test, the "4" and "5" series embodiments of the disclosed composition of the present invention were installed in filter socks without the use of the steel canister. None of the "4" or "5" series filter socks were observed to become stuck in the wells tested, indicating that the preferred granular form of the disclosed composition successfully prevented the excessive swelling of the filter socks by providing a sufficient "sacrificial" internal void space, as intended by the inventor. Moreover, the "4" and "5" series compositions were observed to hold their granular shape within the filter socks over the three-week observation period. These observations, combined with the available data, indicate that the increased permeability of these granular forms, relative to the powdered slurry formed by the fully-disintegrated granules, appears to provide for the enhanced release of active oxygen.

I claim:

1. A solid-chemical composition which provides a sustained-release of active oxygen and complex inorganic phosphates, comprising:
    a. A solid-chemical source of active oxygen being one or more selected from the group consisting of calcium peroxide and magnesium peroxide, from about 57% to 95% by weight percent of said composition;
    b. Sodium hexametaphosphate, being a complex inorganic phosphate, from about 0.25% to 25% by weight percent of said composition;
    c. Sodium trimetaphosphate, being a complex inorganic phosphate from about 0.25% to 25% by weight percent of said composition;
    d. Pre-gelled starch, being an organic disintegrant, from about 0.1% to 4% by weight percent of said composition;
    e. Magnesium stearate, being a lubricant, from about 0.05% to 1% by weight percent of said composition.

2. The solid-chemical composition of claim 1, further comprising another complex inorganic phosphate being one or more selected from the group consisting of sodium tripolyphosphate, sodium-potassium tripolyphosphate, and tetrasodium polyphosphate, from about 0.1% to 15% by weight percent of said composition.

3. The solid-chemical composition of claim 1, further comprising a source of inorganic nitrogen from about 0.1% to 5% by weight percent of said composition.

4. The solid-chemical composition of claim 1, further comprising an ammonium-free source of inorganic nitrogen being one or more selected from the group consisting of sodium nitrate, sodium-potassium nitrate, potassium nitrate, and other soluble salts of nitrate, from about 0.1% to 5% by weight percent of said composition.

5. The solid-chemical composition of claim 1, further comprising a simple inorganic orthophosphate, from about 0.1% to 20% by weight percent of said composition.

6. The solid-chemical composition of claim 1, further comprising a simple inorganic orthophosphate being one or more selected from the group consisting of sodium phosphate, calcium phosphate, potassium phosphate, and sodium-potassium phosphate, from about 0.1% to 20% by weight percent of said composition.

7. The solid-chemical composition of claim 1, further comprising another organic disintegrant being one or more selected from the group consisting of powdered molasses, granulated sugar, sodium starch glycolate, crosscarmelose of sodium, and crospovidone, from about 0.01% to 1% by weight percent of said composition.

8. The solid-chemical composition of claim 1, further comprising an inorganic disintegrant, from about 0.05% to 10% by weight percent of said composition.

9. The solid-chemical composition of claim 8, further comprising an inorganic disintegrant being one or more selected from the group consisting of bentonite, montmorillonite, kaolinite, and other clay minerals, from about 0.05% to 10% by weight percent of said composition.

10. The solid-chemical composition of claim 1, further comprising an inorganic buffer, from about 0.5% to 30% by weight percent of said composition.

11. The solid-chemical composition of claim 1, further comprising an inorganic buffer being one or more selected from the group consisting of calcium carbonate, lime, limestone, siderite and ferrous carbonate, rhodochrosite and manganese carbonate, calcium phosphate, sodium bicarbonate, portland cement, metal oxides, metal hydroxides, and metal oxyhydroxides, from about 0.5% to 30% by weight percent of said composition.

12. The solid-chemical composition of claim 1, further comprising a metal catalyst for chemical-oxidation reactions, from about 0.25% to 15% by weight percent of said composition.

13. The solid-chemical composition of claim 1, further comprising a metal catalyst being one or more selected from the group consisting of ferrous sulfate and other soluble salts of ferrous iron, from about 0.25% to 15% by weight percent of said composition.

14. The solid-chemical composition of claim 1, further comprising another lubricant being one or more selected from the group consisting of calcium stearate and other stearates, stearic acid, sodium stearyl fumarate, hydrogenated vegetable oil, silicone, talc, and corn starch, from about 0.01% to 1% by weight percent of said composition.

15. The solid-chemical composition of claim 1, 2, 3, 4, 5, 6, 7, 8, 9, 10, 11, 12, 13, or 14, whereby said composition is prepared in the form of granules, briquettes, tablets, capsules, pellets, and any combinations thereof.

16. A solid-chemical composition prepared in the form of granules, briquettes, tablets, capsules, pellets, and any combinations thereof, which provides a sustained-release of active oxygen and complex inorganic phosphates, comprising:
    a. a solid-chemical source of active oxygen being one or more selected from the group consisting of calcium peroxide and magnesium peroxide, from about 57% to 95% by weight percent of said composition;
    b. sodium hexametaphosphate, being a complex inorganic phosphate, from about 0.25% to 25% by weight percent of said composition;
    c. sodium trimetaphosphate, being a complex inorganic phosphate, from about 0.25% to 25% by weight percent of said composition;
    d. a lubricant, being one or more selected from the group consisting of magnesium stearate, calcium stearate and other stearates, stearic acid, sodium stearyl fumarate, hydrogenated vegetable oil, silicone, talc, and corn starch, from about 0.01% to 1% by weight percent of said composition; and
    e. a disintegrant, being one or more selected from the group consisting of pre-gelled starch, powdered molasses, granulated sugar, sodium starch glycolate, crosscarmelose of sodium, crospovidone, bentonite, montmorillonite, kaolinite, and other clay minerals, from about 0.01% to 10% by weight percent of said composition.

17. The solid-chemical composition of claim 16, further comprising another complex inorganic phosphate being one or more selected from the group consisting of sodium tripolyphosphate, sodium-potassium tripolyphosphate, and tetrasodium polyphosphate, from about 0.1% to 15% by weight percent of said composition.

18. The solid-chemical composition of claim 16, further comprising a source of inorganic nitrogen from about 0.1% to 5% by weight percent of said composition.

19. The solid-chemical composition of claim 16, further comprising an ammonium-free source of inorganic nitrogen being one or more selected from the group consisting of sodium nitrate, sodium-potassium nitrate, potassium nitrate, and other soluble salts of nitrate, from about 0.1% to 5% by weight percent of said composition.

20. The solid-chemical composition of claim 16, further comprising a simple inorganic orthophosphate, from about 0.1% to 20% by weight percent of said composition.

21. The solid-chemical composition of claim 16, further comprising a simple inorganic orthophosphate being one or more selected from the group consisting of sodium phosphate, calcium phosphate, potassium phosphate, and sodium-potassium phosphate, from about 0.1% to 20% by weight percent of said composition.

22. The solid-chemical composition of claim 16, further comprising an inorganic buffer, from about 0.5% to 30% by weight percent of said composition.

23. The solid-chemical composition of claim 16, further comprising an inorganic buffer being one or more selected from the group consisting of calcium carbonate, lime, limestone, siderite and ferrous carbonate, rhodochrosite and manganese carbonate, calcium phosphate, sodium bicarbonate, portland cement, metal oxides, metal hydroxides, and metal oxyhydroxides, from about 0.5% to 30% by weight percent of said composition.

* * * * *